US007911482B1

(12) United States Patent
Mariano et al.

(10) Patent No.: US 7,911,482 B1
(45) Date of Patent: Mar. 22, 2011

(54) METHOD AND SYSTEM FOR EFFICIENT ANNOTATION OF OBJECT TRAJECTORIES IN IMAGE SEQUENCES

(75) Inventors: Vladimir Y. Mariano, Laguna (PH); Harish Raju, Munhall, PA (US); Rajeev Sharma, State College, PA (US)

(73) Assignee: VideoMining Corporation, State College, PA (US)

( * ) Notice: Subject to any disclaimer, the term of this patent is extended or adjusted under 35 U.S.C. 154(b) by 1113 days.

(21) Appl. No.: 11/650,492

(22) Filed: Jan. 4, 2007

Related U.S. Application Data

(60) Provisional application No. 60/756,776, filed on Jan. 6, 2006.

(51) Int. Cl.
*G09G 5/00* (2006.01)
(52) U.S. Cl. ........................................... 345/676
(58) Field of Classification Search .................. 345/676, 345/678, 680; 382/103, 291, 311
See application file for complete search history.

(56) References Cited

U.S. PATENT DOCUMENTS

| | | | | |
|---|---|---|---|---|
| 5,583,980 | A | 12/1996 | Anderson | 345/473 |
| 6,076,734 | A | 6/2000 | Dougherty et al. | 235/462.01 |
| 6,215,505 | B1 * | 4/2001 | Minami et al. | 345/473 |
| 6,388,669 | B2 * | 5/2002 | Minami et al. | 345/474 |
| 6,452,615 | B1 | 9/2002 | Chiu et al. | 715/776 |
| 6,480,186 | B1 | 11/2002 | McCabe et al. | 345/168 |
| 6,587,119 | B1 * | 7/2003 | Anderson et al. | 345/672 |
| 6,741,655 | B1 * | 5/2004 | Chang et al. | 375/240.26 |
| 6,867,880 | B2 | 3/2005 | Silverbrook et al. | 358/1.18 |
| 6,873,993 | B2 | 3/2005 | Charlesworth et al. | 707/102 |
| 7,146,022 | B2 * | 12/2006 | Masukura et al. | 382/103 |
| 2001/0005208 | A1 * | 6/2001 | Minami et al. | 345/474 |
| 2002/0181741 | A1 * | 12/2002 | Masukura et al. | 382/103 |

OTHER PUBLICATIONS

V.Y. Mariano, J. Min, J.H. Park, D. Mihalcik, D. Doermann and R. Kasturi, "Performance evaluation of object detection algorithms", Proceedings of 16th International Conference on Pattern Recognition, IEEE Computer Society, 2002, pp. 965-969.*
VideoMining website's web page for Patents, Sep. 24, 2010, http://www.videomining.com/patents/main.html, pp. 1-3.*
Annotation Guidelines for Video Analysis and Content, Extraction (VACE-II), Version 6.2, Submitted to Advanced Research and Development Activity and University of South Florida, Jan. 25, 2006, Submitted by VideoMining Corporation, http://clear-evaluation.org/downloads/Annotation_Guidelines_Version_6.2-1.pdf, pp. 1-23.*
D. Doermann and D. Mihalcik, "Tools and techniques for video performance evaluation," Proceedings of 15th International Conference on Patern Recognition, 2000, pp. 167-170.

(Continued)

*Primary Examiner* — Jeffery A Brier

(57) ABSTRACT

The invention is a method and apparatus for quickly marking object trajectories in an image sequence. The traditional method of manually tracking an object is by marking the location of the object in each image in the image sequence. In the present invention, the object is first tracked in one direction by one quick stroke of a spatial input device across the subsampled image sequence that is laid out in that direction. The object is then tracked in an orthogonal direction by another quick stroke of the spatial input device across the same subsampled image sequence that is laid out in the orthogonal direction. The intersections of the two tracks will then form the points of the 2-D neo-trajectory, which is then interpolated onto the image sequence. The invention is useful not only for quick manual annotation of tracks, but also for performance evaluation and optimization of automatic tracking algorithms. Example use of this invention is for behavior annotation and development of tools for automatic behavior analysis.

16 Claims, 7 Drawing Sheets

OTHER PUBLICATIONS

X.S. Hua, L. Wenyin and H.J. Jiang, "An automatic performance evaluation protocol for video text detection algorithms," IEEE Transactions of Circuits and Systems for Video Technology, Apr. 2004, pp. 498-507.

* cited by examiner

METHOD AND SYSTEM FOR EFFICIENT ANNOTATION OF OBJECT TRAJECTORIES IN IMAGE SEQUENCES

CROSS-REFERENCE TO RELATED APPLICATIONS

This application is based on and claims priority to U.S. Provisional Application No. 60/756,776, filed Jan. 6, 2006, which is fully incorporated herein by reference.

FEDERALLY SPONSORED RESEARCH

Not Applicable

SEQUENCE LISTING OR PROGRAM

Not Applicable

BACKGROUND OF THE INVENTION

1. Field of the Invention

The present invention is in the field of annotating image sequences, where object trajectories are specified by a user on an interactive display system.

2. Background of the Invention

Annotation of images has been used in a number of inventions. U.S. Pat. No. 6,480,186, by L. McCabe and J. Wojciechowski, describes an apparatus and method for annotating single images captured by an ultrasound machine. Characters are placed on the image using an alphanumeric input device. The device is limited to annotation of single images, and not on ultrasound image sequences. From single images, this can be extended to image sequences or video. U.S. Pat. No. 6,452,615, by P. Chiu, L. Wilcox and A. Kapuskar, disclosed a notetaking system wherein video streams are annotated. The notes taken during the notetaking session are time-stamped and indexed into the video stream for later playback. U.S. Pat. No. 6,867,880, by K. Silverbrook and P. Lapstun, disclosed a method and system for instructing a computer using coded marks. Through a drag and drop mechanism, the user is able to perform image manipulation from a given album or folder. U.S. Pat. No. 5,583,980, by G. Anderson, presents a method of annotating an image and synchronizing this annotation with a time-based program. Pen movements on the image are captured and synchronized with the program, which is played in another screen during annotation. It could be argued that this method could potentially be used for annotating object trajectories, but real-time marking of objects in video requires the user to accurately anticipate where the object is going. Furthermore, manual tracking in real-time is virtually impossible if the object exhibits a lot of random movement. U.S. Pat. No. 6,873,993, by Charlesworth, et al., relates to an apparatus and method for indexing sequences of sub-word units, such as sequences of phonemes or the like. This can be seen as a parallel in the text domain. U.S. Pat. No. 6,076,734, by Dougherty, et al., provides a variety of methods and systems for providing computer/human interfaces, but it only provides a generic method for any interface and does not talk about means of automating or accelerating data input tasks for any specific domain.

Manual annotation of video images has been used in the quantitative performance evaluation of vision algorithms. Pixel-accurate performance evaluation has been used for object detection algorithms. In the paper by Mariano, et al., "Performance Evaluation of Object Detection Algorithms", Proceedings of Intl Conference on Pattern Recognition, 2002, images are annotated by marking objects like text with bounding boxes. Other evaluation methods used similar bounding-box annotations, like in the work of Hua, et al., "An automatic performance evaluation protocol for video text detection algorithms", IEEE Transactions of Circuits and Systems for Video Technology, 2004. Since the test video data has a lot of frames to annotate, the inefficient frame-by-frame marking of text blocks makes the task very time consuming. For text that does not move, the bounding box where the text first appeared can be propagated to the subsequent frames. But for moving text, such as movie credits or scene text such as the characters on a moving truck, the text blocks have to be tediously tracked from frame to frame.

Manual annotation of image sequences is an important task in the analysis of image sequences. Objects in image sequences can be counted, tracked and marked with metadata such as text and colored tags. For example, in market research of retail stores, stored video can be watched and annotated to count people, track them around the store, and record the time they spend in particular spots.

Another important purpose of manual annotation of image sequences is in the development of object tracking algorithms. Many computer vision methods for tracking require manually-generated data of object trajectories. This data is also called the "ground-truth". This data can be divided into two types—training and test data. The tracking methods "learn" from the training data to set its internal parameters. The trajectories in the test data are then used to quantitatively evaluate the performance of the algorithm. The tracking algorithm's internal parameters can then be optimized to maximize the performance measures. Another important use of ground-truth trajectory data is in comparing different tracking algorithms. Two or more tracking algorithms can be run on a single trajectory data set and their results are compared by some performance measure.

A tool for annotating video data is the result of the work of David Doermann and David Mihalcik, "Tools and Techniques for Video Performance Evaluation", Proceedings of Intl Conference on Pattern Recognition, Volume 4, 2000. The system, called ViPEr, provides random access of frames in a video and allows objects to be marked and tracked across consecutive frames. The ViPEr tool was used to evaluate algorithms for detecting objects in video—the work of Mariano, et al., "Performance Evaluation of Object Detection Algorithms", Proceedings of Intl Conference on Pattern Recognition, 2002. One inefficiency with using ViPEr is that an object trajectory is marked by clicking on the object location for each frame in the image sequence. Furthermore, the images in the sequence are displayed one at a time, requiring the user to skip to the next frame after marking the object location in the current frame. The repeated mark-then-skip routine takes a lot of time, especially when annotating hours of videos containing many objects to be tracked.

Instead of using the traditional "mark-then-skip-to-next-frame" routine, the present invention shows many consecutive frames in one screen and the user spatially tracks the object across the displayed consecutive frames.

SUMMARY

The present invention is a method and system for efficiently marking the trajectory of an object across an image sequence. An interactive system displays in one screen the consecutive frames of an image sequence containing the object to be tracked. To speed up the annotation in a long image sequence, an initial temporal sampling of frames is performed, creating a subsampled image sequence. This subsampled image sequence is displayed in one direction across the interactive screen. Using a single stroke of a spatial input device, such as a mouse, stylus or digital pen, the user spatially tracks the object, thereby creating the first of two orthogonal trajectories across the displayed subsampled image sequence. The same subsampled image sequence is also displayed in the same interactive screen but in an orthogonal direction. Using another stroke of the spatial input device, the user again tracks the object across the orthogonally displayed subsampled image sequence, thereby creating the second of two orthogonal trajectories. The two orthogonal trajectories are created using the spatial input device form intersections in each image in the subsampled image sequence. The intersections would then form the 2-D neo-trajectory of the object. From the neo-trajectory in the subsampled image sequence, the trajectory in the image sequence is interpolated.

In the exemplary embodiment, an image sequence contains an exemplary object, a person, to be tracked. The user marks the track of the person's head using the interactive system.

DRAWINGS

Figures

DETAILED DESCRIPTION OF THE INVENTION

The following embodiment exemplifies the method and system for efficiently specifying object trajectories in an image sequence. The invention consists of displaying the subsampled image sequence on an interactive screen, specifying the two orthogonal trajectories, computing the neo-trajectory, and interpolating the trajectory from the neo-trajectory. The computed trajectory can then be stored.

Figure 1:
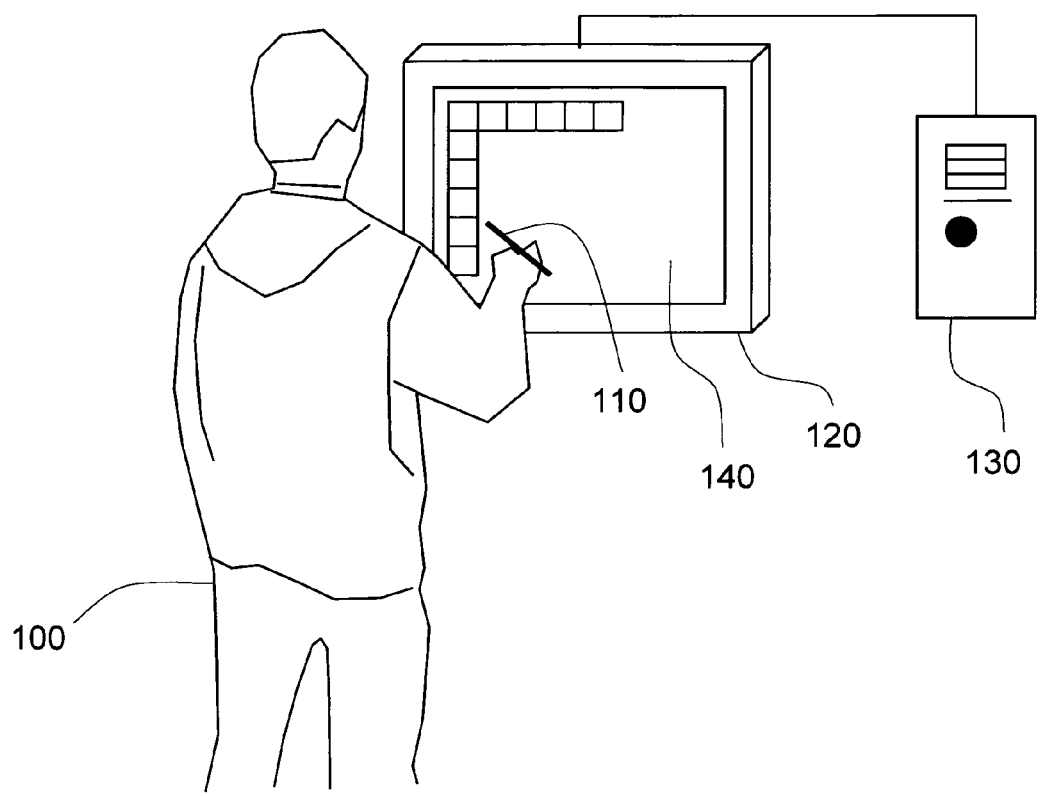
FIG. 1 shows the user interacting with the interactive screen using a spatial input device such as a digital pen.

FIG. 1 shows the user interacting with the annotation system. An interactive display screen 120 is attached to a computer 130, which processes the user interaction. The user 100 interacts with the interactive screen 120 using a spatial input device 110. This device could be a digital pen, mouse, stylus or anything that could specify a location on the interactive screen. The user 100 specifies locations on the interactive screen 120 by dragging the spatial input device across the items 140 displayed on the interactive screen.

Figure 2:
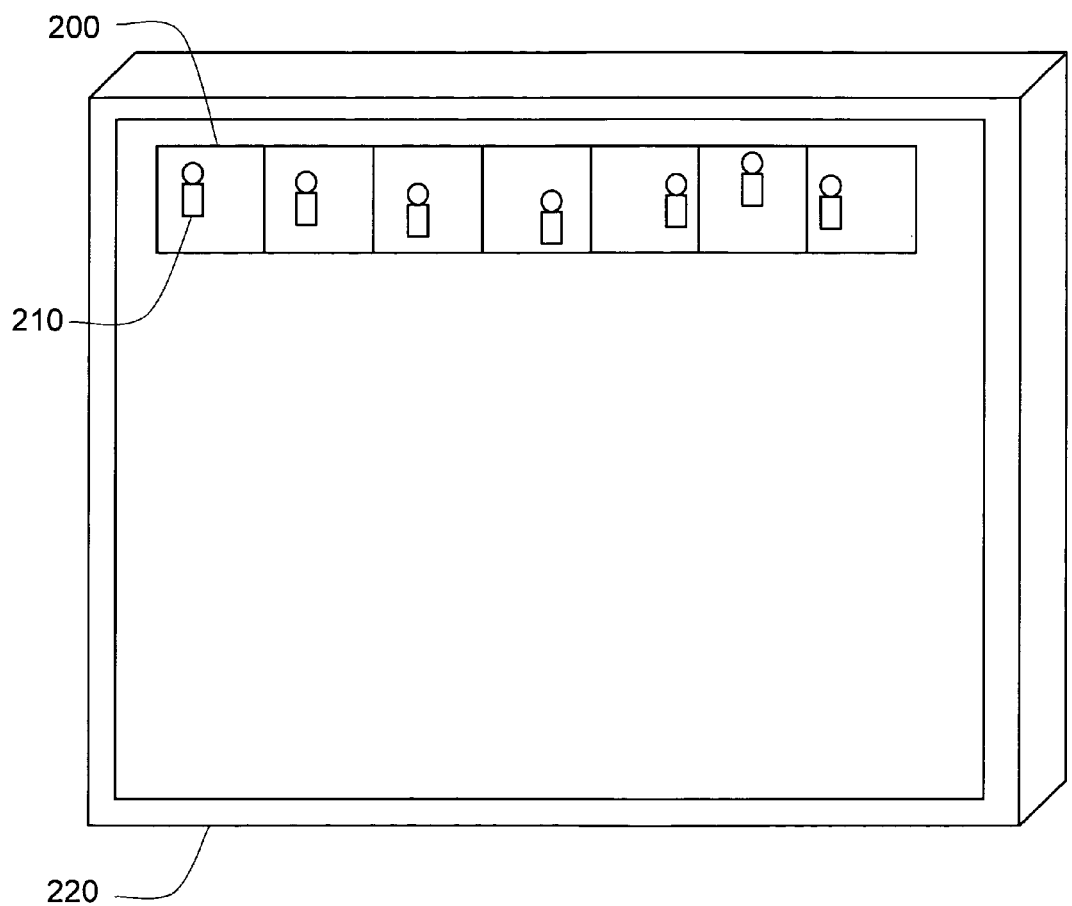
FIG. 2 shows the interactive screen displaying the subsampled image sequence containing a moving object.

FIG. 2 shows the interactive screen displaying the subsampled image sequence containing a moving object. The interactive screen 220 (120 in FIG. 1) shows consecutive images 200 of the subsampled image sequence. Due to a potentially large number of images in the original image sequence, the system does not display every image. Instead, the system takes images between intervals and displays a subsampled image sequence. This interval can be set as a parameter. The task addressed by the invention is the manual specification of the trajectories of an object in an image sequence. The images 200 of the displayed subsampled image sequence contain a moving object 210 whose trajectory the user will specify.

Figure 3:
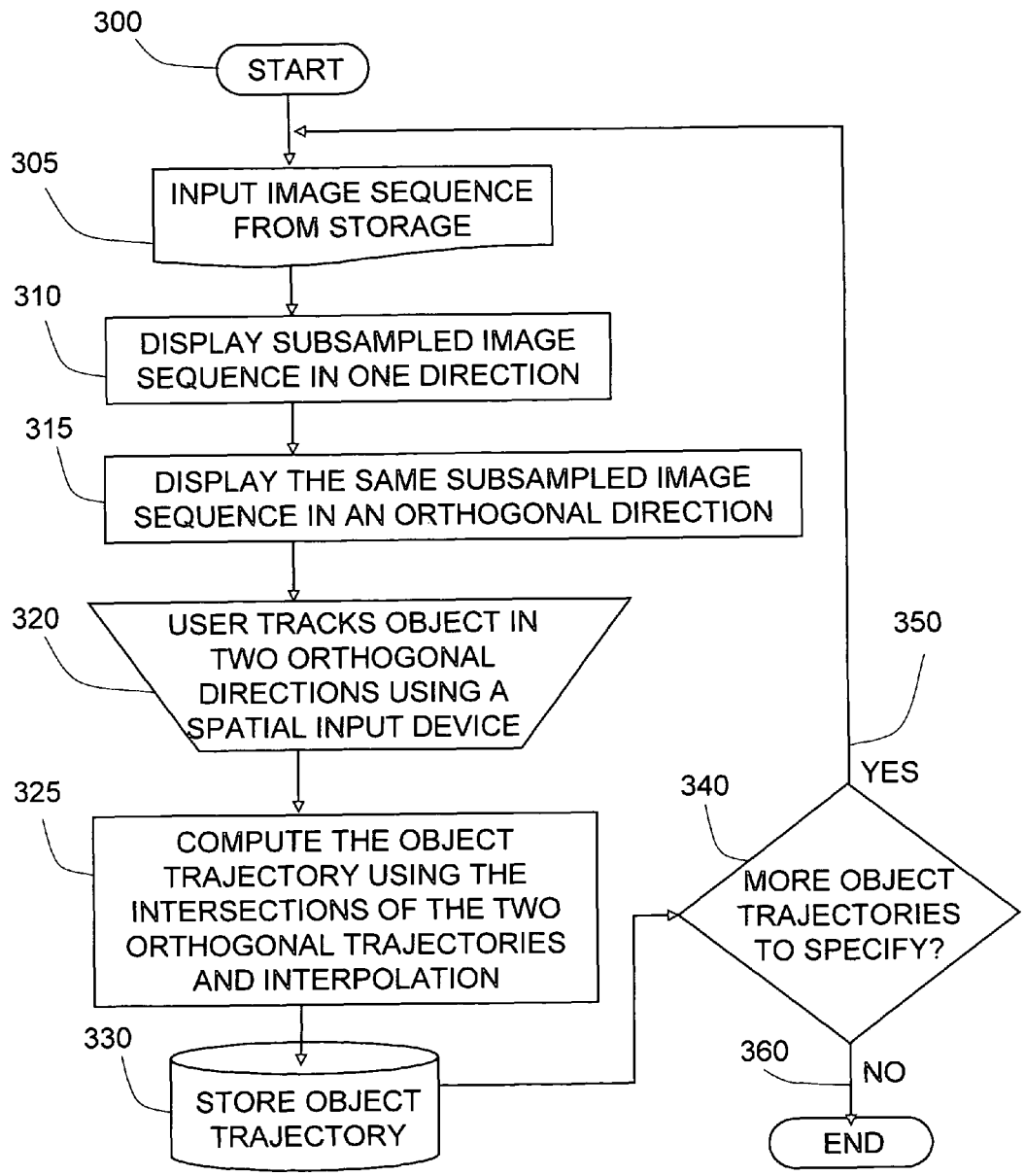
FIG. 3 is a flowchart of the method for specifying object trajectories.

The flowchart in FIG. 3 shows how the system works. As the system starts 300, an image sequence is fetched from the memory of the computer 305. A temporal subsample of this image sequence is displayed 310 on the interactive screen. A subsampled image sequence may still contain a large number of images, so the system displays only the images that can fit on the interactive screen. To access the other images, the displayed subsampled image sequence can be scrolled during the annotation session. The subsampled image sequence is lined up in one direction. The same sequence is displayed in the same screen 315, but this time the images are lined up in an orthogonal, or perpendicular, direction. The user then uses a spatial input device 320 to spatially track the object in the two orthogonally displayed image sequences, producing two orthogonal trajectories. A computation 325 is performed on the two orthogonal trajectories, producing a neo-trajectory consisting of the intersections of the two orthogonal trajectories in the subsampled image sequence, and interpolation to the image sequence. The computed trajectory is stored back to the system 330. The user is allowed to specify more object trajectories 340 and can continue to do so 350 until there are no more trajectories 360 to specify.

Figure 4:
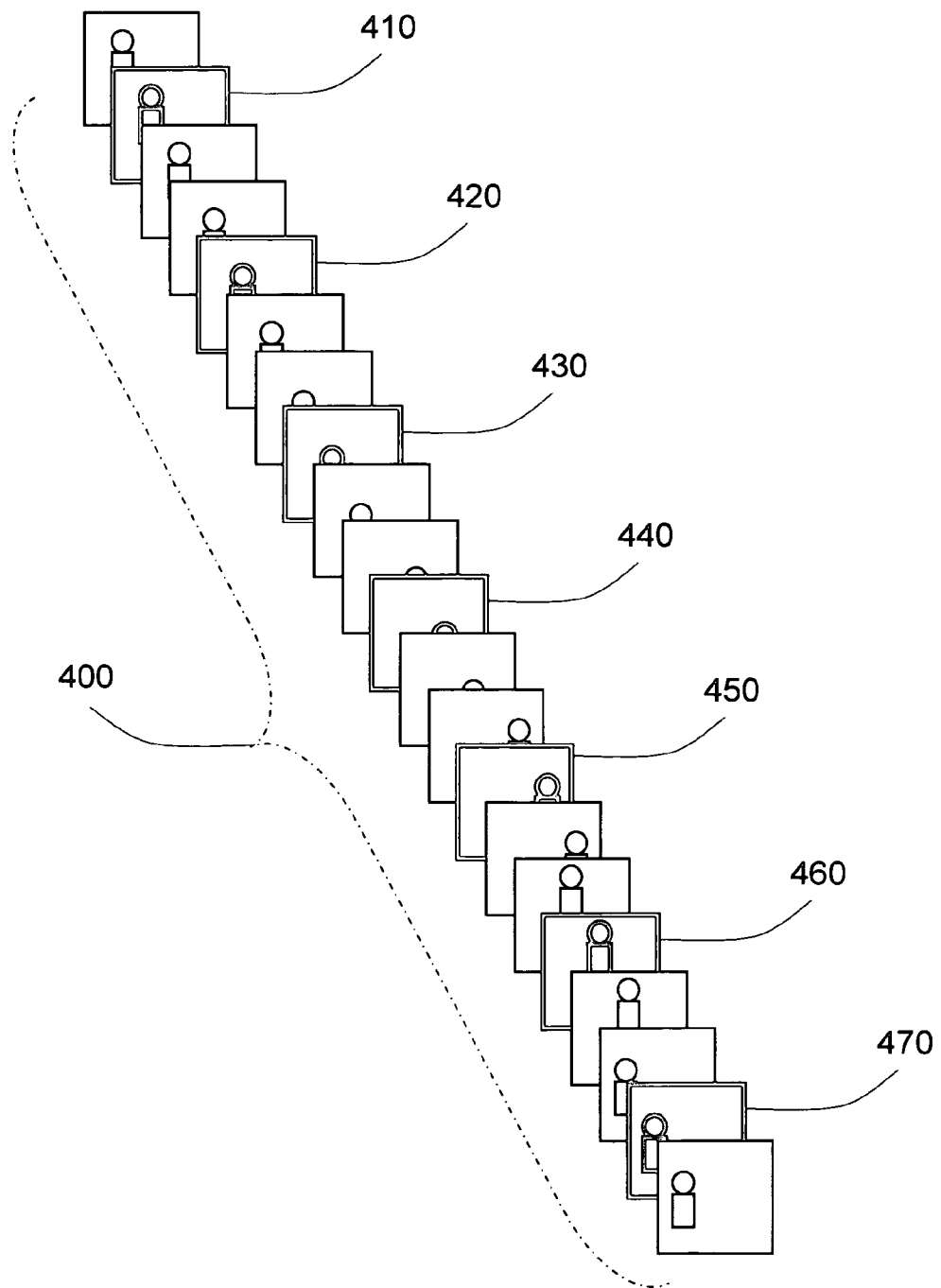
FIG. 4 shows the subsampling of the image sequence before the specification of the object trajectory.

In annotating an image sequence, a temporal subsampling from the image sequence would allow a significantly less amount of time to annotate a large image sequence while preserving the smoothness of marked object trajectories. FIG. 4 shows the image sequence and the temporally subsampled image sequence. The image sequence 400 can be composed of a large number of images. Using certain frame intervals, images can be selected (410 420 430 440 450 460 470) prior to annotation. This image interval can be selected to be sufficiently large to significantly reduce the annotated images, yet not so large to miss the minute motion details of the object of interest.

Figure 5:
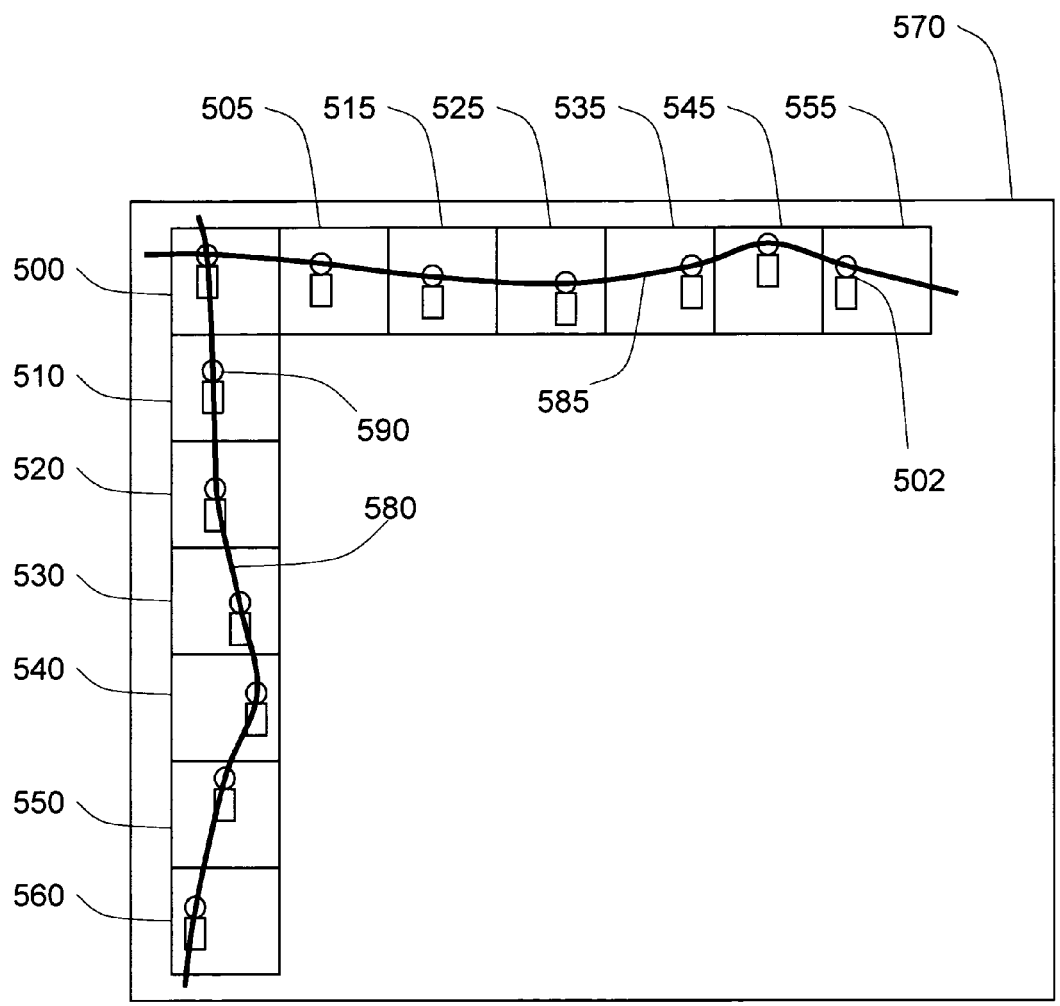
FIG. 5 illustrates how the two orthogonal trajectories are specified to track an object across the subsampled image sequence.

FIG. 5 shows how the two orthogonal trajectories are specified. The interactive screen 570 (140 in FIG. 1) shows a subsampled image sequence as it is marked with two orthogonal trajectories. A portion of the subsampled image sequence is displayed (images 500 505 515 525 535 545 and 555). These images contain the object 502 to be tracked. In this embodiment, the images are lined up horizontally. The same set of images is lined up in the orthogonal direction (images 500 510 520 530 540 550 and 560) and the object to be tracked 590 is shown. Note that image 505 is the same as image 510, image 515 is 520, image 525 is 530, image 535 is 540, image 545 is 550, and image 555 is the same as 560. In this example, the task is to mark the trajectory of the moving person's head 502. Using a spatial input device, which for this embodiment is a digital pen, the user first tracks 585, the moving object 502, along the horizontally-lined images, producing the first of two orthogonal trajectories. Next, the user tracks 580 the moving object along the vertically-lined images using the digital pen, producing the second of two orthogonal trajectories. The two orthogonal trajectories are made quickly using two quick strokes of the digital pen, because the user can see the object and easily follow it in all the lined up images. Thus in this invention, the traditional temporal traversal of images is innovatively converted to a spatial traversal of images.

Figure 6:
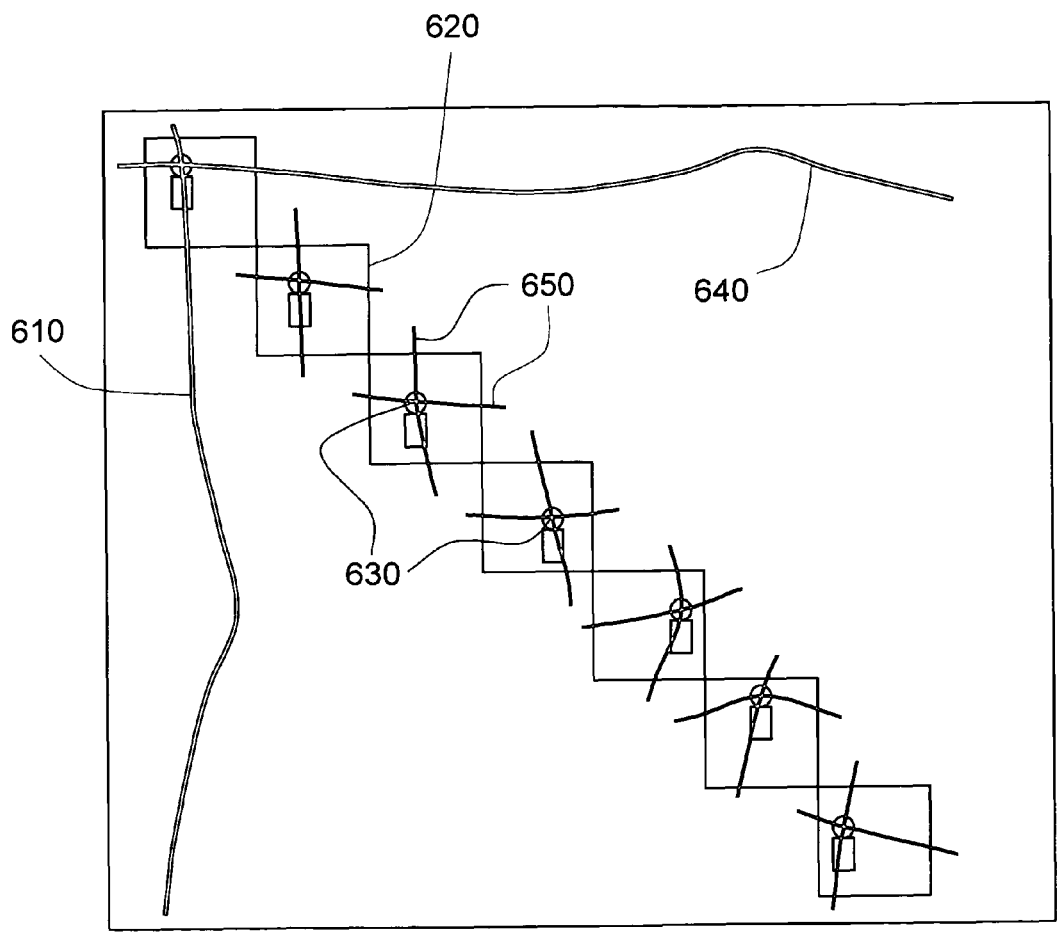
FIG. 6 shows how the neo-trajectory is computed using the intersections of the two orthogonal trajectories.

After the two orthogonal trajectories are specified, the neo-trajectory of the object in the subsampled image sequence is computed. FIG. 6 illustrates how this is computed. The first of two orthogonal trajectories is shown in 640 (585 in FIG. 5), and the second of two orthogonal trajectories is shown in 610 (580 in FIG. 5). These two orthogonal trajectories cross each image in the subsampled image sequence, but each is from a different direction—the first 640 crosses from the left, while the second 610 comes from the top. In this figure, the images 620 in the subsampled image sequence are shown in the diagonal. The figure illustrates that each image is crossed 650 by the first and the second orthogonal trajectories. These two orthogonal trajectories intersect at the 2-D location of the moving object 630. The intersections are computed in all the images, and these would form the neo-trajectory of the object in the subsampled image sequence.

Figure 7:
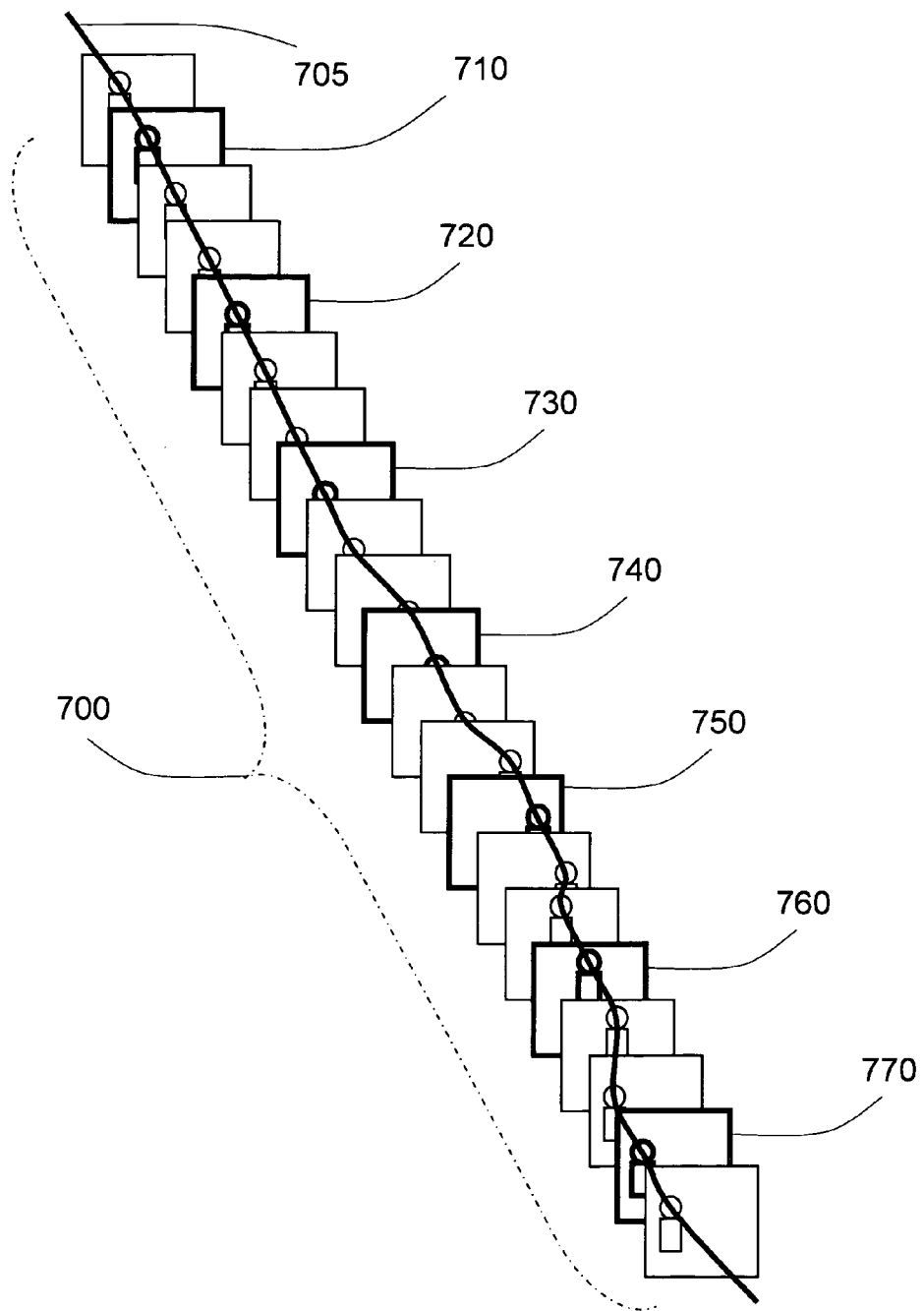
FIG. 7 shows the interpolation of the trajectory in the image sequence from the neo-trajectory in the subsampled image sequence.

The temporal subsampling of images illustrated in FIG. 4 allows a fast annotation of an object in an image sequence. The subsampling interval was small enough so as not to miss the object's motion details between the sampled images. The neo-trajectory in the subsampled image sequence is then interpolated to the image sequence. FIG. 7 illustrates this interpolation step. The image sequence 700 was subsampled using a fixed image interval (images 710 720 730 740 750 760 770). After the computing the neo-trajectory of the object in the subsampled image sequence, the object's 2-D locations in all the images of the image sequence are estimated from the object's 2-D locations in the neo-trajectory. Estimation can be done using a smooth interpolation function.

The exemplary embodiment, described in detail with the drawings and description, illustrates how the present invention works. The illustration is exemplary and not intended to be restrictive in character. The changes and modifications that come within the spirit of the invention are desired to be protected.

What is claimed is:

1. A method for specifying the trajectory of an object in an image sequence, comprising the steps of:
   a) taking a subsampled image sequence from said image sequence in a memory,
   b) displaying said subsampled image sequence in two orthogonal directions on an interactive screen that is attached to a computer,
   c) marking two orthogonal trajectories of said object using a spatial input device on said subsampled image sequence displayed in said two orthogonal directions on said interactive screen,
   d) computing the intersection of said two orthogonal trajectories in each image of said subsampled image sequence, thereby defining a coordinate in each said image, and thereby defining a neo-trajectory of said object in said subsampled image sequence comprising said coordinate in each said image in said subsampled image sequence,
   whereby said neo-trajectory is defined by two orthogonal trajectories as input achieved by two quick strokes of said spatial input device, and
   e) computing said trajectory in said image sequence using said two orthogonal trajectories on said subsampled image sequence using the computer,
   whereby said spatial input device can be a digital pen, a computer mouse, a stylus, or any device that can be used to specify a location on said interactive screen.

2. The method according to claim 1, wherein the method further comprises a step for specifying the first of said two orthogonal trajectories by dragging said spatial input device and creating a track across said subsampled image sequence displayed in the first of said two orthogonal directions on said interactive screen,
   wherein said track passes through said object in each image in said subsampled image sequence.

3. The method according to claim 1, wherein the method further comprises a step for specifying the second of said two orthogonal trajectories by dragging said spatial input device and creating a track across said subsampled image sequence displayed in the second of said two orthogonal directions on said interactive screen,
   wherein said track passes through said object in each image in said subsampled image sequence.

4. The method according to claim 1, wherein the method further comprises a step for interpolating said trajectory of said object in said image sequence from said neo-trajectory of said object in said subsampled image sequence.

5. An apparatus for specifying the trajectory of an object in an image sequence, comprising:
   a) a memory that stores the image sequence,
   b) a computer that takes a subsampled image sequence from said image sequence,
   c) an interactive screen that displays said subsampled image sequence in two orthogonal directions, and
   d) a spatial input device that is used to mark two orthogonal trajectories of said object on said subsampled image sequence displayed in said two orthogonal directions on said interactive screen,
   wherein the computer performs a process of computing the intersection of said two orthogonal trajectories in each image of said subsampled image sequence, thereby defining a coordinate in each said image, and thereby defining a neo-trajectory of said object in said subsampled image sequence comprising said coordinate in each said image in said subsampled image sequence, whereby said neo-trajectory is defined by two orthogonal trajectories as input achieved by two quick strokes of said spatial input device,
   wherein the computer performs a process of computing said trajectory in said image sequence using said two orthogonal trajectories on said subsampled image sequence, and
   whereby said spatial input device includes a digital pen, a computer mouse, a stylus, or any device that can be used to specify a location on said interactive screen.

6. The apparatus according to claim 5, wherein the apparatus further comprises a computing device for specifying the first of said two orthogonal trajectories when a user drags said spatial input device and creates a track across said subsampled image sequence displayed in the first of said two orthogonal directions on said interactive screen,
   wherein said track passes through said object in each image in said subsampled image sequence.

7. The apparatus according to claim 5, wherein the apparatus further comprises a computing device for specifying the second of said two orthogonal trajectories when a user drags said spatial input device and creates a track across said subsampled image sequence displayed in the second of said two orthogonal directions on said interactive screen,
   wherein said track passes through said object in each image in said subsampled image sequence.

8. The apparatus according to claim 5, wherein the apparatus further comprises a computing device for interpolating said trajectory of said object in said image sequence from said neo-trajectory of said object in said subsampled image sequence.

9. A method for following an object and marking its object trajectory in an image sequence, comprising the steps of:
   a) obtaining a subsampled set of images from said image sequence in a memory, b) displaying said subsampled set of images in a first direction on an interactive screen that is attached to a computer, c) following said object towards said first direction using a spatial input device on said interactive screen and marking a first trajectory of said object, d) displaying said subsampled set of images in a second direction on said interactive screen such that said second direction is orthogonal to said first direction, e) following said object towards said second direction using said spatial input device on said interactive screen and marking a second trajectory of said object, f) computing the intersection of said first trajectory and said second trajectory in each image of said subsampled set of images to form the coordinates of the neo-trajectory of said object in said subsampled set of images using the computer, and g) computing interpolated coordinates of said object trajectory from said neo-trajectory using the computer, whereby said spatial input device can be a stylus, a computer mouse, a digital pen, or any device that can be used to specify locations on said interactive screen.

10. The method according to claim 9, wherein the method further comprises a step for sampling said subsampled set of images from said image sequence at fixed intervals.

11. The method according to claim 9, wherein the method further comprises a step for sampling said subsampled set of images from said image sequence at varying intervals, wherein said intervals are increased if there is no significant motion between consecutive images and said intervals are decreased if there is significant motion between said consecutive images.

12. The method according to claim 9, wherein the method further comprises a step for dragging said spatial input device across said interactive screen to specify said first trajectory, wherein a track is marked across the subsampled set of images displayed in the first direction on said interactive screen, and wherein said track passes through said object in each image of said subsampled set of images.

13. The method according to claim 9, wherein the method further comprises a step for dragging said spatial input device across said interactive screen to specify said second trajectory, wherein a track is marked across the subsampled set of images displayed in the second direction on said interactive screen, wherein said track passes through said object in each image of said subsampled set of images, and whereby said second direction is orthogonal to said first direction.

14. The method according to claim 9, wherein the method further comprises a step for allowing a limited number of images in said subsampled set of images to be displayed in said interactive screen and allowing a scrolling mechanism to allow other adjacent images to be displayed, thereby allowing said first trajectory and said second trajectory to be specified across the said subsampled set of images.

15. The method according to claim 9, wherein the method further comprises a step for computing the intersections of said first trajectory with said second trajectory for each image in said subsampled set of images, wherein the computation defines the location of said object in each image in said subsampled set of images, and wherein the computation defines each coordinate of said neo-trajectory of said object.

16. The method according to claim 9, wherein the method further comprises a step for computing said interpolated coordinates of said object trajectory using a smooth interpolating function applied on the coordinates of said neo-trajectory, wherein said object trajectory is used to record the path of transient objects across an image sequence of a scene.

* * * * *